Patented May 11, 1948

2,441,493

UNITED STATES PATENT OFFICE 2,441,493

DESULFURIZATION OF HYDROCARBONS WITH BORON PHOSPHATE-ALUMINA CATALYST

Robert C. Krug, Yeadon, Pa., assignor to The Atlantic Refining Company, Philadelphia, Pa., a corporation of Pennsylvania No Drawing. Application June 10, 1947,
Serial No. 753,806

8 Claims. (Cl. 196—28)

The present invention relates to the catalytic desulfurization of hydrocarbons under conditions such that substantial decomposition of the hydrocarbons is avoided.

More particularly, the present invention relates to the desulfurization of petroleum hydrocarbons at elevated temperature in the presence of a catalyst consisting essentialy of boron phosphate and alumina, the hydrocarbons remaining substantially undecomposed while the contained sulfur compounds are converted to hydrogen sulfide which is thereafter removed from the treated hydrocarbons. The catalyst used in the present invention, i. e., an intimate mixture of boron phosphate and alumina, either or both of which may contain a small amount of water of hydration, has been found highly effective in converting sulfur compounds into hydrogen sulfide without substantially decomposing the hydrocarbons, and has also been found to produce much less carbon that other catalysts heretofore utilized in desulfurization processes.

In accordance with the present invention, hydrocarbons containing sulfur compounds, and particularly petroleum hydrocarbons such as furnace oil distillates, kerosene, naphtha, gasoline, or normally gaseous hydrocarbons or mixtures including ethane, ethylene, propane, propylene, and the butanes and butylenes, are desulfurized at atmospheric or higher pressure by contacting with a catalyst composed of boron phosphate and alumina at temperatures between 600° F. and 800° F., and preferably at 700° F. The space velocity in the desulfurization method may range from 0.5 to 2 volumes of hydrocarbon per volume of catalyst per hour, and is preferably of the order of 1. The catalyst composition employed consists essentially of 5% to 25% of boron phosphate and 95% to 75% of alumina. The preferred range is 5% to 15% of boron phosphate and 95% to 85% of alumina. Excellent results have been obtained with a catalyst composed of 10% of boron phosphate and 90% of alumina.

The catalyst may be prepared by several methods, of which the following is preferred.

Chemically equivalent amounts of 85% concentration $H_3PO_4$ and crystilline boric acid or boric anhydride are mixed, and the mixture is heated at 100° C. to 150° C. for sufficient time to effect reaction, whereby $BPO_4$ is obtained as a brittle solid containing a small amount of water of hydration. Alternatively, the $BPO_4$ may be produced by reacting boric anhydride with $POCl_3$, or by reacting boron trichloride with $P_2O_5$. In any case, the $BPO_4$ is obtained as a water-insoluble solid, stable to heat, not hydrolyzed by acids, and only slowly attacked by concentrated alkali solutions.

The desired quantity of solid $BPO_4$, for example, 10% by weight, is suspended in water with vigorous stirring to form a slurry. A second slurry is made up by suspending alumina, for example, 90% by weight, in water and the two slurries are thoroughly mixed. The aqueous suspension medium is then removed from the composite $BPO_4$-alumina, and the composite is dried, for example, at 220° F. to remove most of the free moisture. The dried catalyst consisting essentially of 10% $BPO_4$-90% alumina is then pelleted in a conventional pelleting machine to form pellets or tablets of desired size, for example, $\tfrac{3}{16}$ inch cylinders about $\tfrac{1}{8}$ inch in length which are then ready for use in the desulfurizing operation. The alumina employed in preparing the composite catalyst may be derived from various sources. Alumina scale from the Bayer process, which has been activated by heating at 600° F. to 1200° F. to a moisture content of about 1.5% or less is satisfactory for use in the preparation of the catalyst. Or, alumina obtained by reacting an aqueous solution of aluminum chloride, nitrate, or sulfate with an alkali metal hydroxide, carbonate, or bicarbonate, or with ammonia, after water-washing and drying is also satisfactory for use. Finely divided naturally occurring aluminum hydrates, such as bauxite, may also be used, with or without preliminary drying or calcination. If desired, the composite $BPO_4$-alumina catalyst, after pelleting, may be heated at 600° F. to 1000° F. prior to use.

In carrying out the desulfurizing operation, a suitable tower or vessel is filled with the catalyst pellets, and the hydrocarbons to be desulfurized are heated to a temperature between 600° F. and 800° F. and passed through the bed of catalyst pellets contained in the tower, the space velocity being maintained between 0.5 and 2 volumes of hydrocarbon per volume of catalyst per hour. To assist in maintaining the desired catalyst temperature, the tower may be jacketed or provided with heat exchange means of conventional design. The sulfur compounds contained in the hydrocarbons, i. e., organic sulfides, disulfides, mercaptans, and thiophenes, etc. are converted by the catalyst into hydrogen sulfide and olefins, and the hydrocarbons after removal from the catalyst tower and cooling, may be freed of hydrogen sulfide by treatment with an aqueous solution of a base such as sodium hydroxide, potassium hydroxide, or amines such as the lower alkylamines or alkanolamines. The desulfurization operation may be carried out in the vapor phase or in the liquid phase, depending upon the pressure maintained in the catalyst tower, preference being had for vapor phase operation. By employing a boron phosphate-alumina catalyst under the conditions specified, substantial desulfurization is obtained with minimum decomposition of hydrocarbons and the deposition of only small amounts of carbon on the catalyst. After continuous service over a prolonged period, the desulfurizing efficiency of the catalyst will decrease, and at such time as it reaches an uneconomic level, the catalyst may be regenerated by steaming followed by burning off the deposited carbon at 800° F. to 1200° F., in the presence of air or other oxidizing gas.

The present invention may be further illustrated by the following examples, in which a furnace oil distillate having a boiling rage of 264° F. to 652° F., an A. P. I. gravity of 38.5°, and a sulfur content of 0.932% was desulfurized by contacting in the vapor phase with a catalyst consisting essentially of 10% BPO$_4$-90% alumina pepared from 85% concentration H$_3$PO$_4$ and boric acid crystals as hereinbefore described. After the catalytic treatment, the hydrocarbon vapors were condensed and washed with sodium hydroxide solution to remove hydrogen sulfide. The results are tabulated below.

|  | 1 | 2 |
|---|---|---|
| Conditions: | | |
| Desulf. temp., ° F | 700 | 800 |
| Desulf. pressure | Atms. | Atms. |
| Space velocity | 1 | 1 |
| Catalyst: | | |
| Grams | 85.7 | 85.2 |
| Cc | 100.0 | 100.0 |
| Furnace oil charge: | | |
| Grams | 166.0 | 166.0 |
| Cc | 200.0 | 200.0 |
| Liquid product: | | |
| Grams | 156.4 | 161.6 |
| Cc | 190.0 | 197.5 |
| Gravity A. P. I degrees | 40.0 | 40.0 |
| Per cent sulfur | 0.513 | 0.417 |
| Per cent sulfur removed | 45.0 | 55.3 |
| Gas—liters @ 78° F | 0.56 | 1.02 |
| Carbon produced, grams | 0.37 | 0.42 |

I claim:

1. The method of desulfurizing hydrocarbons containing sulfur compounds without substantial decomposition of the hydrocarbons, which comprises contacting said hydrocarbons with a boron phosphate-alumina catalyst at a temperature between 600° F. and 800° F. for a period of time sufficient to convert the sulfur compounds to hydrogen sulfide, and removing the hydrogen sulfide from the treated hydrocarbons.

2. The method of desulfurizing hydrocarbons containing sulfur compounds without substantial decomposition of the hydrocarbons, which comprises contacting said hydrocarbons with a boron phosphate-alumina catalyst at a temperature between 600° F. and 800° F. at a space velocity between 0.5 and 2 to convert the sulfur compounds to hydrogen sulfide, and removing the hydrogen sulfide from the treated hydrocarbons.

3. The method of desulfurizing hydrocarbons containing sulfur compounds without substantial decomposition of the hydrocarbons, which comprises contacting said hydrocarbons with a boron phosphate-alumina catalyst at a temperature of about 700° F. at a space velocity of about 1 to convert the sulfur compounds to hydrogen sulfide, and removing the hydrogen sulfide from the treated hydrocarbons.

4. The method of desulfurizing hydrocarbons containing sulfur compounds without substantial decomposition of the hydrocarbons, which comprises contacting said hydrocarbons with a catalyst consisting essentially of 5%–25% boron phosphate and 95%–75% alumina at a temperature between 600° F. and 800° F. for a period of time sufficient to convert the sulfur compounds to hydrogen sulfide, and removing the hydrogen sulfide from the treated hydrocarbons.

5. The method of desulfurizing hydrocarbons containing sulfur compounds without substantial decomposition of the hydrocarbons, which comprises contacting said hydrocarbons with a catalyst consisting essentially of 5%–25% boron phosphate and 95%–75% alumina at a temperature between 600° F. and 800° F. at a space velocity between 0.5 and 2 to convert the sulfur compounds to hydrogen sulfide, and removing the hydrogen sulfide from the treated hydrocarbons.

6. The method of desulfurizing hydrocarbons containing sulfur compounds without substantial decomposition of the hydrocarbons, which comprises contacting said hydrocarbons with a catalyst consisting essentially of 5%–25% boron phosphate and 95%–75% alumina at a temperature of about 700° F. at a space velocity of about 1 to convert the sulfur compounds to hydrogen sulfide, and removing the hydrogen sulfide from the treated hydrocarbons.

7. The method of desulfurizing hydrocarbons containing sulfur compounds without substantial decomposition of the hydrocarbons, which comprises contacting said hydrocarbons with a catalyst consisting essentially of 10% boron phosphate and 90% alumina at a temperature between 600° F. and 800° F. for a period of time sufficient to convert the sulfur compounds to hydrogen sulfide, and removing the hydrogen sulfide from the treated hydrocarbons.

8. The method of desulfurizing a furnace oil distillate containing sulfur compounds without substantial decomposition of said distillate, which comprises contacting said distillate with a catalyst consisting essentially of 5%–15% boron phosphate and 95%–85% alumina at a temperature between 600° F. and 800° F. for a period of time sufficient to convert the sulfur compounds to hydrogen sulfide, and removing the hydrogen sulfide from the treated distillate.

ROBERT C. KRUG.

REFERENCES CITED

The following references are of record in the file of this patent:

UNITED STATES PATENTS

| Number | Name | Date |
|---|---|---|
| 1,997,761 | Egloff et al. | Apr. 16, 1935 |